May 9, 1933. W. J. MANN 1,907,989
BELT CONVEYER
Filed June 13, 1930
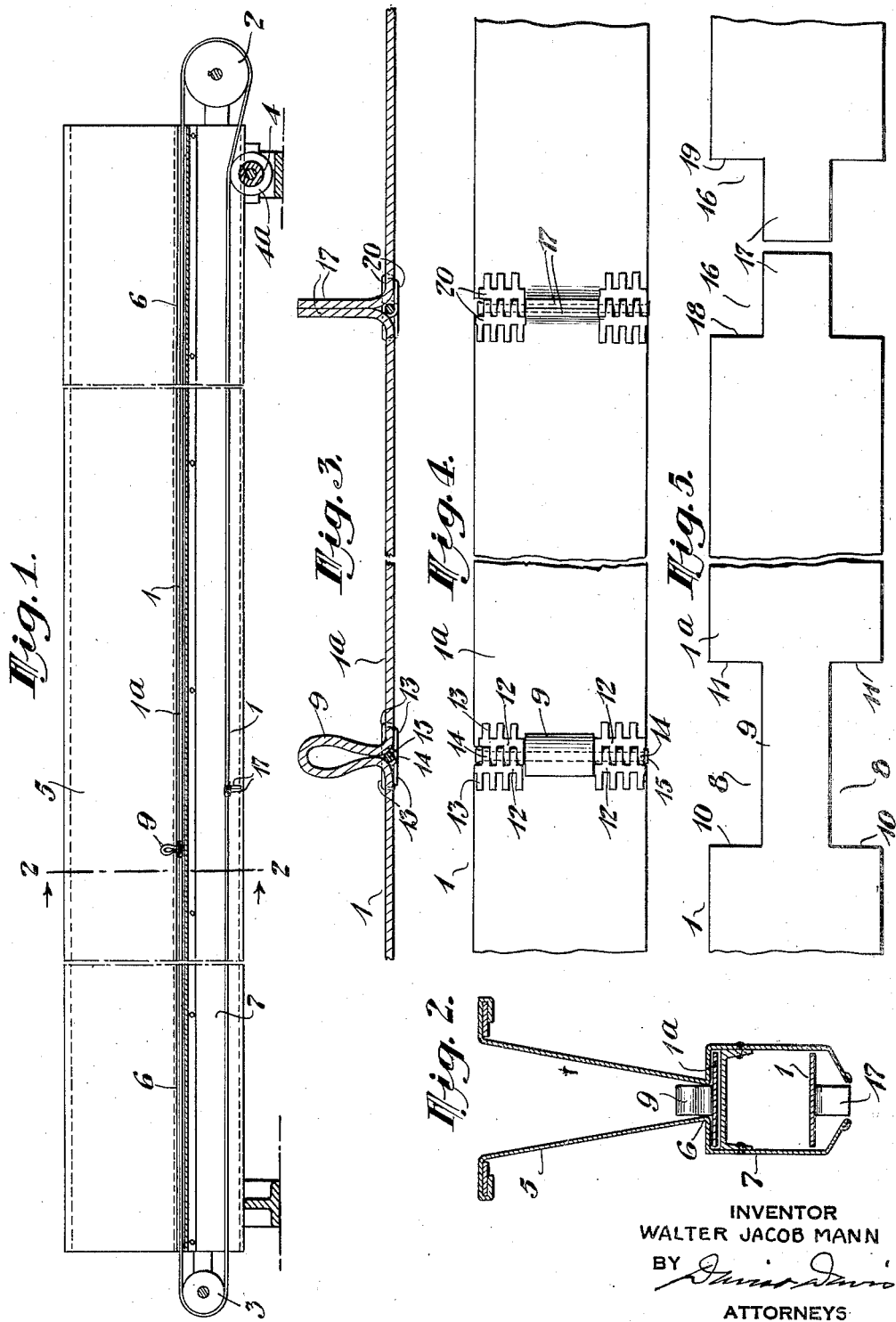
INVENTOR
WALTER JACOB MANN
BY
ATTORNEYS Patented May 9, 1933

1,907,989

UNITED STATES PATENT OFFICE

WALTER JACOB MANN, OF PLAINFIELD, NEW JERSEY, ASSIGNOR TO GENERAL CONVEYORS LIMITED, OF MONTREAL, CANADA, A CORPORATION OF CANADA

BELT CONVEYER

Application filed June 13, 1930. Serial No. 460,874.

This invention relates more particularly to belt conveyers of a type employed in telegraph offices or the like for conveying dispatch sheets. Such conveyers often comprise a conveyer line formed by a horizontally disposed belt, and a trough extending over and along said belt and adapted to receive the sheets from the operators stationed therealong, direct the sheets into contact with the belt and guide them along the line as they are conveyed by the belt. Often the sheets tend to cling to the trough so that it is advisable to provide the belt with pick-up means to engage the sheets and positively propel them along the line. Important objects of the present invention are, to provide said belt with an improved pick-up means designed to cooperate satisfactorily with a particular type of trough, and to provide for the forming of said pick-up means integrally with the belt in a simple and satisfactory manner.

In the drawing, Fig. 1 is a longitudinal sectional view of a belt conveyer line embodying my invention;

Fig. 2 is a transverse section upon a larger scale taken on the line 2—2 of Fig. 1;

Fig. 3 is a longitudinal sectional view of a portion of the belt showing the integral pick-up means;

Fig. 4 is a fragmentary plan view of the belt showing the pick-up means; and

Fig. 5 is a fragmentary plan view of the belt showing the blank form of the latter for producing the integral pick-up means.

The conveyer line illustrated includes a flat conveyer belt 1 trained in a horizontal course around a drive pulley 2 and a follower pulley 3 and over a guide pulley 4 which supports the under strand of the belt. A trough 5 is disposed directly over the belt and extends therealong for most of the length of the conveyer line. At its bottom said trough has a straight narrow slot 6 opening downward directly upon the conveyer face 1$^a$ of the upper strand or reach of the belt and extending continuously along the longitudinal center thereof. The belt is preferably a narrow one, approximately two inches in width and the trough has a narrow V-shaped cross section, with its sides converging to the slot 6. A housing 7 is formed along the under side of the trough and encloses the reaches of the belt between the pulleys 2 and 3.

Operators positioned at points along the conveyer line deposit the dispatch sheets in the trough and the trough supports them substantially upright with their lower edges projecting through the slot and in contact with the conveyer surface 1$^a$ of the belt. The conveyance of the sheets in upright position and by only an edge contact with the belt greatly reduces the required width of the belt, enables it to be driven at a high speed and facilitates the removal of the sheets from the belt. Often, however, due to several causes, some of the sheets stick in the trough and their transmission is prevented or delayed. To overcome this difficulty I have provided the belt with improved pick-up means integrally formed upon the belt and designed for operating in a satisfactory manner to engage the sheets adhering to the trough and positively propel them along the line.

At an intermediate point in its length the belt, in blank, is formed at its opposite edges with rectangular cut-outs 8. Between said cut-outs is left a narrow central neck 9 of slightly less width than the slot 6 of the trough. Said neck is to form a pick-up projection and for this purpose the belt is contracted longitudinally and the neck is bent or bowed to project transversely outward from the conveyer face 1$^a$ of the belt and form a loop. The contraction of the belt brings the transverse edges 10 and 11 of the unreduced portions of the belt into close, opposed relation at opposite sides of the loop and said edges are securely fastened together by any suitable means. I prefer to employ for this purpose what is known to the trade as "alligator belt lacing" which is in the form of metal skeleton strips 12 having sharp transverse fingers 13 extending from opposite sides of the strips and staggered. The strips are cut to the required length and the fingers are bent to clinch them to the belt at one edge of the latter and to form eyes or loops 14 which are adapted to intermesh and register with similar loops of a strip clinched to the opposed belt edge. Through the registering loops 14 is passed a pintle 15. Thereby the edges 10 and 11 are securely held together, the looped neck 9 is held practically closed and projected from the conveying face of the belt and the belt is enabled to flex freely at this point.

At its ends the belt is formed with squared cut-outs 16 at opposite sides to define two reduced, centered end portions or tabs 17 of the same size and form. Said tabs are to form another pick-up projection and for this purpose they are bent transversely outward from the conveyer face 1ª of the belt and brought into face to face contact. Thereby the edges 18 and 19 of the unreduced portions of the belt are brought into close, opposed relation. They are held in this relation and the belt is held closed by metal lacing 20 similar to that just described. The contacting tabs 17 hold each other projected from the conveying face of the belt.

The belt may be formed of any suitable material, a belt made of rubber and canvas being very satisfactory. The pick-up projection 9 and the pick-up projection formed by the tabs 17 have sufficient length and stiffness to satisfactorily perform their function and at the same time they have a desired yield and resilience. The projections extend upward through the trough slot 6 as they travel therealong and, in entering the slot, they will strike the trough if the belt is not centered upon its pulleys. Since, however, they are made of the flexible springy material of the belt they will readily yield, with little wear or strain, until the obstruction is passed, whereupon they will spring back into shape. Forming them from the belt in no way weakens or stiffens the latter. On the contrary the belt is stronger and more flexible at those points. To provide clearance for the pick-up projection the guide pulley 4 supporting the under strand of the belt is centrally grooved as at 4ª.

What I claim is:

1. A conveyer belt formed at a point in its length with an integral neck portion of reduced width bent transversely outward from the conveying face of the belt in the form of a loop; and fastening means joining the opposed unreduced portions of the belt at opposite sides of said neck to hold the belt contracted and maintain said loop for picking up and propelling articles, said fastening means being disposed free of the loop.

2. A conveyer belt formed with end portions reduced in width, transversely centered, bent transversely outward from the conveying face of the belt and disposed in face to face contact; and fastening means joining opposed unreduced portions of the belt at opposite sides of the roots of said reduced ends to maintain said ends in face to face contact and projected to pick up and propel articles, said fastening means being disposed free of said projected ends.

3. A conveyer belt formed with end portions reduced in width, transversely centered, bent transversely outward from the conveying face of the belt and disposed in face to face contact, fastening means disposed free of said reduced end portions and joining opposed unreduced portions of the belt at opposite sides of the roots of said reduced ends to maintain said ends in face to face contact and projected to pick up and propel articles; the belt being formed at an intermediate point in its length with a neck portion of reduced width bent transversely outward from the conveying face in the form of a loop; and fastening means disposed free of said loop and holding the belt contracted at said loop and maintaining the loop projected to pick up and convey articles.

4. A conveyer belt comprising a flat web of flexible, springy material, the web at a point in its length having a transversely centered portion of materially reduced width bent outward to form opposed, mutually supporting plies projecting from the conveyer face of the belt; and hinge means joining opposed edges of the unreduced portions of the web at opposite sides of said plies and holding the belt contracted and the plies in mutually supporting relation, the plies forming a flexible, springy pick-up projection yieldable throughout and capable of springing back into erect operative position and said hinge means lying substantially flat with the web and being disposed free of said pick-up projection.

5. A conveyer belt comprising a flat web of flexible, springy material, the web at a point in its length having a transversely centered portion of materially reduced width bent outward to form opposed, mutually supporting plies projecting from the conveyer face of the belt; and means joining opposed edges of the unreduced portions of the web at opposite sides of said plies and holding the belt contracted and the plies projected, the plies forming a flexible, springy pick-up projection yieldable throughout and capable of springing back into erect, operative position and said joining means lying substantially flat with the web and being disposed free of said pick-up projection.

6. A conveyer belt comprising a flat web of flexible, springy material, the web at a point in its length being formed with a narrow neck portion transversely centered and bent outward to form a loop projecting from the conveyer face of the belt; and means joining opposed transverse edges of the unreduced portions of the web at opposite sides of the loop and thereby holding the belt contracted and the loop projected, the loop forming a flexible, springy pick-up projection yieldable throughout and capable of springing back into erect operative position and said joining means lying substantially flat with the web and being disposed free of said pick-up projection.

7. A conveyer belt comprising a flat web of flexible springy material and formed with end portion of materially reduced width transversely centered, bent outward from the conveyer face of the belt and disposed face to face in mutually supporting relation, the web being also formed with a materially reduced transversely centered neck portion bent outward to form a loop projecting from the conveyer face of the belt; and means joining opposed transverse edges of the unreduced portions of the belt at opposite sides of said projecting ends and at opposite sides of the loop, holding the belt longitudinally contracted and the ends and loop projected to form erect, flexible, springy pick-up projections yieldable throughout in all directions, said joining means lying substantially flat with the web and being disposed free of said pick-up projections.

8. In a belt conveyer line, a trough having a narrow slot along its bottom, and inner side walls converging downward toward said slot; a conveyer belt extending along and closely adjacent to the under side of the trough and upwardly exposed along its longitudinal center through said slot for receiving thereon articles delivered into the trough and conveying them along the trough, the belt comprising a flat web of flexible, springy material having at a point in its length a transversely centered portion of materially reduced width bent outward to form opposed, mutually supporting plies projecting from the conveyer face of the belt; and means joining opposed transverse edges of the unreduced portions of the web at opposite sides of said plies and holding the belt contracted and the plies projected to form an erect, flexible, springy pick-up projection disposed for projecting upward through the trough slot and positively conveying articles along the trough, said projection being yieldable throughout in all directions to accommodate it to the trough slot and being capable of springing back into erect operative position, and said joining means lying substantially flat with the web and being disposed free of said pick-up projection.

9. In a belt conveyer line, a trough having a narrow slot along its bottom and inner longitudinal side walls converging downward toward said slot; a conveyer belt extending along and closely adjacent to the under side of the trough and upwardly exposed along its longitudinal center through said slot for receiving thereon sheets delivered into the trough, the belt comprising a flat web of flexible, springy material having at a point in its length a transversely centered neck portion of materially reduced width bent outward to form a loop; and means joining opposed transverse edges of the unreduced portions of the web at opposite sides of said loop to hold the latter projected to form an erect, flexible, springy pick-up projection disposed for projecting upward through the trough slot and positively conveying the sheets along the trough, said projection being yieldable throughout in all directions to accommodate it to the trough slot and being capable of springing back into erect operative position, and said joining means lying substantially flat with the web and being disposed free of the pick-up projection.

10. A conveyer belt comprising a flat, flexible, springy web having at a point in its length, integral portions of reduced width bent outward to form opposed mutually supporting plies spaced inward from the opposite longitudinal edges of the belt; and hinges at opposite sides of said plies joining opposed transverse edges of the wider portions of the web and holding the belt contracted with the plies erect to form a flexible springy pick-up projection extending materially above said hinges.

11. A conveyer belt comprising a flat, flexible, springy, web formed at a point in its length with an integral neck portion of reduced width spaced inward from the opposite longitudinal edges of the belt and bent outward to form a loop projecting from the conveyer face of the belt; and hinges at opposite sides of said loop joining opposed transverse edges of the wider portions of the belt at opposite sides of the loop to hold the belt contracted with the loop projected to form a flexible springy pick-up projection extending materially above said hinges.

In testimony whereof I hereunto affix my signature.

WALTER JACOB MANN.